UNITED STATES PATENT OFFICE.

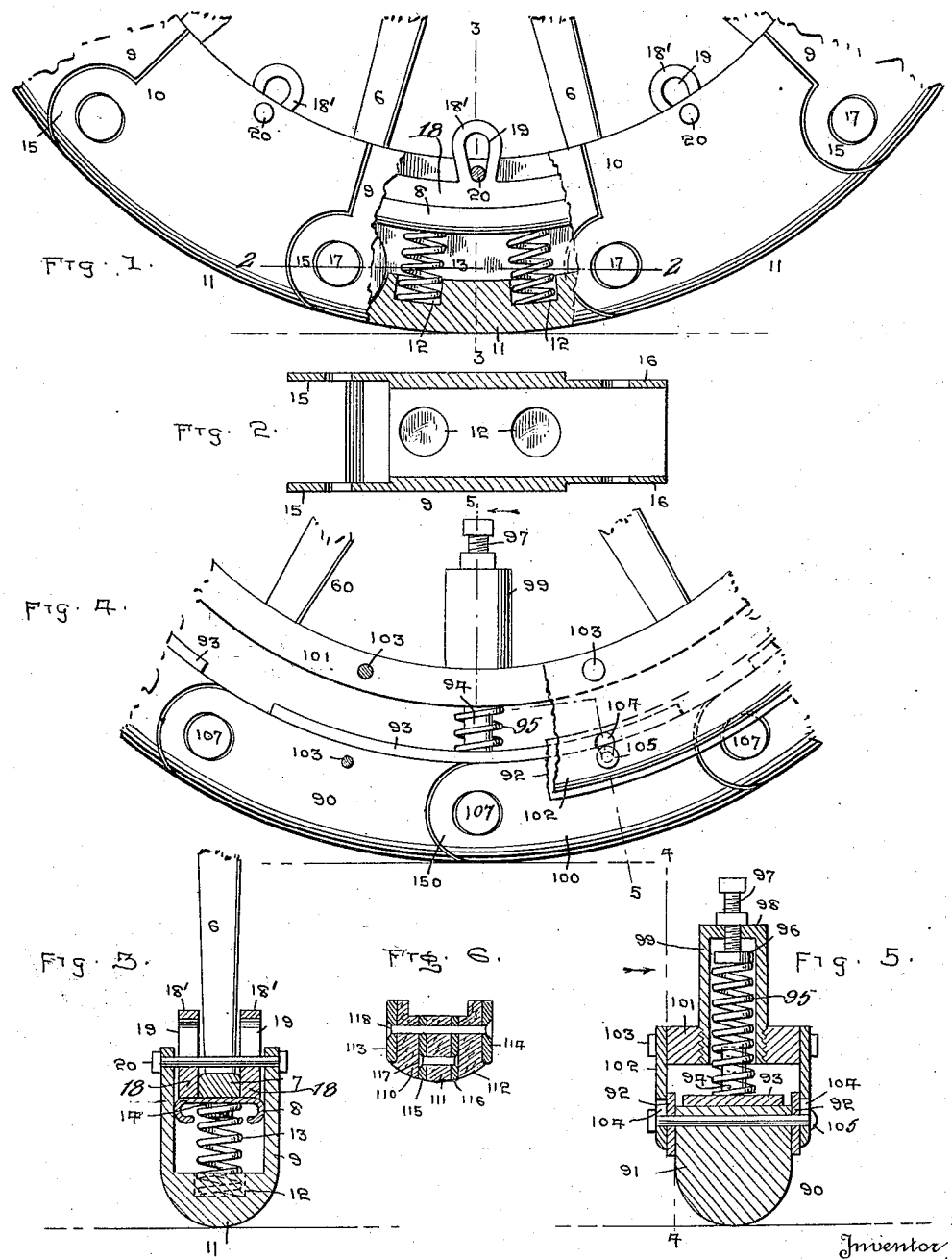

JOHN WILLIAM COOK, OF MIAMI, FLORIDA, ASSIGNOR OF ONE-THIRD TO J. L. MEGATHLIN, OF MIAMI, FLORIDA.

TIRE FOR VEHICLES.

1,191,918.   Specification of Letters Patent.   Patented July 18, 1916.

Application filed May 6, 1915. Serial No. 26,250.

*To all whom it may concern:*

Be it known that I, JOHN WILLIAM COOK, a citizen of the United States, residing at Miami, in the county of Dade and State of Florida, have invented certain new and useful Improvements in Tires for Vehicles; and I do hereby declare the following to be a full, clear, and exact description of the invention, such as will enable others skilled in the art to which it appertains to make and use the same.

This invention relates to tires for vehicles and particularly to spring or resilient tires for use especially on automobiles or motor vehicles, but generally on any vehicle needing such tires.

The prime object of the invention is to provide an improved tire of the class specified which will be of simple and economical construction and not liable to breakage or injury in ordinary use.

A further object of the invention is to provide an improved tire composed of hinged sections, and spring supports, which will take the place of pneumatic tires and will last much longer.

A further object of the invention is to provide a tire of the character specified in which the sections are made of compressed paper or rawhide, or of such materials combined with metal plates.

With these objects in view the invention consists in the improved construction, arrangement and combination of the parts of a device of the character mentioned, which will be hereinafter fully described and afterward specifically claimed.

In order that the construction and operation thereof may be readily comprehended, an approved embodiment and modification of the invention are illustrated in the accompanying drawings and will be now specifically described in connection with said drawings, in which, Figure 1 represents, in elevation, partly broken away, a portion of a wheel equipped with my invention. Fig. 2 represents a sectional view on a plane cutting through one of the sections of my improved tire, as indicated by line 2—2 of Fig. 1. Fig. 3 represents a sectional view taken on the radial plane indicated by the broken line 3, 3, of Fig. 1. Fig. 4 represents a portion of a modified form of my invention, partly in section on the plane indicated by the broken line 4, 4, of Fig. 5, with parts broken away and parts shown in dotted lines. Fig. 5 represents a sectional view of the structure of Fig. 4, taken on the zigzag plane indicated by the broken line 5, 5, of Fig. 4, and Fig. 6 represents a sectional view of one of the tire sections composed of compressed paper or raw hide, with embedded metal plates.

Like reference characters indicate the same parts wherever they appear in a plurality of the figures of the drawings.

Referring particularly to Figs. 1, 2 and 3 of the drawings, 6 indicates the spokes of the wheel, to the outer ends of which is attached the usual rim 7, around which is mounted a metallic plate 8, having its edges curved outwardly toward the periphery of the wheel and inwardly toward the line of the spoke. 9 and 10 indicate two adjacent tread sections which form the tread of the tire and which are U-shaped in section, as particularly shown in Fig. 3 of the drawings with their outer tread edges, as at 11, rounded transversely. Within the tread portion of each of the sections are two recesses 12, in which are mounted the outer ends of the springs 13, the inner ends of which are mounted upon projections 14 from the metallic rim plate 8 in the center line thereof. Each section is formed at one end with projecting forked ears 15 which embrace the opposite ends 16 of the next adjacent section and are pivotally connected thereto by means of bolts 17. Mounted alongside of the rim 7, on each face of the wheel, is a circular plate 18 which extends entirely around the wheel inclosing the outer ends of the spokes, said plate being rigidly secured to the rim. At points opposite the center of each of the sections, these plates 18 are provided with inwardly extending loop members 18' provided with oval-shaped slots 19, which receive bolts 20, which also pass through the inner edges of the sections, and when there is no pressure upon the tires and the springs 13 are extended, these bolts 20 rest in the small outer ends of these slots 19, but when pressure is placed upon the tire, the springs 13 are compressed and permit the tire to yield inwardly, carrying the bolts 20 inward into the larger portion of the slots 19, which will permit of play in the direction of the circumference of the wheel. The length of the slots, radially, permits of play of either or both ends of the bolts 20, simultaneously or consecutively, thus rendering the tire resilient in all directions. When special pressure is brought upon the joint of two adjacent sections, the springs permit them to yield simultaneously or consecutively, motion with relation to each other being permitted to the sections by their pivotal connecting bolts 17.

In Figs. 4 and 5, I have illustrated a modified form of my invention in which the same spokes are used as in the construction hereinbefore described, but which are indicated as 60 in this instance and the sections of this tire, indicated at 90 and 100, which are of the same construction, are each provided with forked ears 150 and reduced ends to be embraced by said forks and pivoted thereto by bolts 107. The tires are solid, as indicated at 91 in Fig. 5 and are provided on each side, near their inner edges with protecting plates 92 which project slightly within the edge of the tire. Upon the inner edge of the tire, crossing the joint of the adjacent sections, is a circular plate 93, conforming to the shape of the ti and having inward projections 94, upon which are mounted coil springs 95, the inner ends of which bear against disks 96 at the outer ends of screws 97, threaded through the heads 98 of radially located tubular structures 99, which at their outer ends are threaded into the rim 101 secured upon the outer ends of the spokes 60. Upon each face of the rim 101 is a ring 102 secured to the rim by bolts 103 and provided with oval-shaped slots 104 which receive bolts 105 which pass through the protecting plates 92 and through the tire near its inner edge, securing the plates 92 permanently to the tire so as to close the inner portion of the structure against the entrance of dust, and the like, through the oval shaped openings 104. Pressure upon any section of the tire will cause it to move inwardly, carrying the bolt 105 inward in the oval-shaped opening, and thus afford inward play to the section of the tire, which, when the bolt reaches the larger inner portion of the slots or openings 104 will be allowed to rock or oscillate in the direction of the periphery of the tire, thus affording play in each direction to the tire when pressure is brought upon it.

In Fig. 6 I have shown a tread section, the parts 110, 111 and 112 of which are composed of compressed paper or raw hide with metal plates 113 and 114 on the sides thereof, and metal plates 115 and 116 embedded therein, all of the parts being secured together by rivets 117 and 118.

From the foregoing, it will be evident that I have provided a wheel of simple and economical construction and one which will serve all the purposes of the ordinary pneumatic wheel, without the tendency to puncture and with much less liability to injury or breakage in ordinary use.

Having thus fully described my invention what I claim as new and desire to secure by Letters Patent of the United States is:—

1. In combination, spokes, a rim, ring plates on opposite sides of the spokes and rim, having oval-shaped slots, U-shaped tire sections having their sides on the outsides of said ring plates, springs between the tire sections and the rim, and bolts passing through the sides of the tire sections, and through the oval-shaped slots in the ring plates and connecting the sides of the tire sections with the ring plates.

2. In combination, spokes, a rim, ring plates on opposite sides of the spokes, having oval-shaped slots, a metal ring secured on the outside of the rim and having inturned edges, U-shaped tire sections having their sides on the outsides of said ring plates, springs between the tire sections and the metal ring, and bolts passing through the sides of the tire sections and through the oval-shaped slots in the ring plates, connecting the sides of the tire sections with the ring plates.

3. In combination, spokes, a rim, ring plates on opposite sides of the rim and having oval-shaped slots, tire sections pivoted together end to end, springs between the tire sections and the rim, and bolts passing through the tire sections and through the oval-shaped slots in the ring plates for slidably connecting the tire sections with the ring plates.

4. In combination, spokes, a rim, ring plates on opposite sides of the rim and having oval-shaped slots, tire sections pivoted together end to end, springs between the tire sections and the rim, means upon said rim and said tire sections for preventing casual displacement of the springs, and bolts passing through the tire sections and through the oval-shaped slots in the ring plates for slidably connecting the tire sections with the ring plates.

In testimony whereof I have signed my name to this specification in the presence of two subscribing witnesses.

JOHN WILLIAM COOK.

Witnesses:
  J. H. RAMSEY,
  MARY A. NALL.

Copies of this patent may be obtained for five cents each, by addressing the "Commissioner of Patents, Washington, D. C."